UNITED STATES PATENT OFFICE.

PAUL HAESELER, OF NEW YORK, N. Y., ASSIGNOR TO THE LIBERTY LABORATORIES, INC., OF NEW YORK, N. Y., A CORPORATION OF NEW YORK.

METHOD OF PRODUCING AND PURIFYING SULFURIC ACID.

1,341,462.  Specification of Letters Patent.  Patented May 25, 1920.

No Drawing.  Application filed September 25, 1918. Serial No. 255,567.

*To all whom it may concern:*

Be it known that I, PAUL HAESELER, a citizen of the United States, and a resident of the city, county, and State of New York, have invented an Improvement in Methods of Producing and Purifying Sulfuric Acid, of which the following is a specification.

My invention relates to a method of making sulfuric acid, and also to a method of purifying the sulfuric acid made by my process or by other processes which result in sulfuric acid which contains impurities of the general character subsequently specified.

It is an object of the present invention to provide a method of making sulfuric acid which shall be simple and economical in operation. It is also an object of the present invention to provide a method of purifying sulfuric acid obtained by the method of my invention or by other methods which produce sulfuric acid containing certain classes of impurities subsequently to be more fully set forth.

By way of example I shall set forth in the following description a preferred embodiment of my invention, it being understood, of course, that my invention may find application in numerous forms other than that herein described.

In one of its forms, my process of making sulfuric acid comprises bringing a sulfur-dioxid-containing substance, preferably a gas, into a reducible oxygen-containing compound of selenium or the like, such as selenium dioxid, selenious acid, tellurium dioxid, or tellurious acid, or mixtures of these substances in any desired proportions, for example. Preferably I employ selenium dioxid or selenious acid as being particularly suited for practising the process of my invention.

Preferably I effect the interaction between the sulfur-dioxid-containing gas or other substance and the reducible oxygen-containing compound of selenium or the like substantially without access of free oxygen, as contained in air, for example. I prefer also to carry out the reaction by bringing the sulfur-dioxid-containing gas into an aqueous solution of the reducible oxygen-containing compound of selenium or the like. Where such compound is selenium dioxid, for example, the solution of the same in water would produce selenious acid.

On passing the sulfur-dioxid-containing gas into the solution of selenious acid, for example, the sulfur dioxid itself goes into solution to form sulfurous acid, which is oxidized by the selenious acid present in the solution to form sulfuric acid, the selenious acid itself being reduced to insoluble elemental selenium, which may be recovered as by filtration. My invention, therefore, also provides a method of producing selenium or tellurium from oxygen-containing reducible componds of the same.

The acid thus formed should preferably be purified by eliminating substantially all of its content of dissolved or reducible oxygen-containing compound of selenium or the like. This is desirable in order to make the acid more suitable for general commercial use in the chemical and other industries where the same may be employed. For this purpose I may effect at least a partial purification by passing the sulfur-dioxid-containing gas into the solution containing the reducible oxygen-containing compound of selenium or the like under pressure. I have discovered that by under pressure the reducible compound of selenium or the like, held in solution or suspension by the sulfuric acid, is more completely eliminated than would otherwise be the case. While various pressures may be employed, I prefer to use a pressure above atmospheric and amounting to two or more atmospheres.

I have discovered, also, that agitation of the mixture during a part or all of the course of the reaction helps to more completely eliminate the reducible oxygen-containing compound of selenium or the like.

The reaction may be carried on at various temperatures, dependent on the concentrations, temperatures and physical condition (that is, whether gases, liquids, or solids) of the reacting substances, and also on the heat radiation, surrounding temperature, pressure and other factors involved in the reaction. The temperature best suited in a given case may be readily determined by trial by testing the strength of acid produced and the amount of impurities present. I prefer, however, to employ temperatures above average normal temperature, that is, above 15° C.

In order to effect a further and more complete elimination of the reducible oxygen-containing compound of selenium or the like contained in solution or in suspension in the sulfuric acid thus formed, I prefer to pass a reducing agent, preferably a gas, preferably under pressure, into such sulfuric acid. Where, as is preferred, such reducing gas is a sulfur-dioxid-containing gas, the purification proceeds with the further production of sulfuric acid and the further and more complete elimination of the reducible oxygen-containing compound of selenium or the like. In this form of the purification process, therefore, the production of the acid and the purification of the same may be considered as comprising a single continuous process, though where, of course, any other reducing agent, such as hydrogen, is employed, the purification process would generally be in addition to and distinct from the process of making the sulfuric acid.

In the process of purifying the acid, elemental selenium or the like is precipitated, being insoluble in water and only slightly soluble in sulfuric acid. Such precipitated elemental selenium or the like may be removed, as by filtration. If desired, the purification process may be repeated one or more times to further purify the sulfuric acid, and to further eliminate the dissolved or suspended reducible oxygen-containing compound of selenium or the like. In such a case, after each purifying operation, it is preferable to remove, as by filtration, the newly precipitated elemental selenium or the like.

In the example given, where the reducible oxygen-containing compound of selenium or the like comprises selenium dioxid, or where an aqueous solution of the same in the form of selenious acid, as is preferred, is employed, the reaction may be represented as follows:

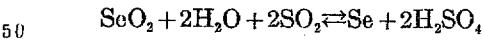

$$SeO_2 + 2H_2O + 2SO_2 \rightleftarrows Se + 2H_2SO_4$$

The selenium recovered during the course of the reaction and in the purifying step or steps may be reoxidized to selenium dioxid to be reutilized in the production and purification of further quantities of sulfuric acid. It is of course to be understood that while various suitable sources of reducible oxygen-containing-compounds of selenium or the like may be employed, such as the oxids or oxyacids of selenium or tellurium, I prefer to use selenium dioxid or selenious acid or the corresponding compounds of tellurium, derived from elemental selenium or tellurium, as the case may be, oxidized to the dioxid stage by any suitable roasting or other oxidizing means.

It is of course to be understood that so much of my process as relates to the purification of sulfuric acid containing in solution or in suspension a reducible compound of selenium or the like, generally an oxygen-containing compound, may be applied to such acid whatever its origin, as well as to such acid made in accordance with my invention. It is also to be understood that my invention is not to be limited to the specific embodiment thereof herein described for purposes of illustration only.

What I claim is:

1. A method of producing sulfuric acid which comprises causing a sulfur-dioxid-containing substance to interact with a reducible oxygen-containing compound of selenium or the like substantially without access of free oxygen.

2. A method of producing sulfuric acid which comprises causing a sulfur-dioxid-containing substance to interact under pressure with a reducible oxygen-containing compound of selenium or the like substantially without access of free oxygen.

3. A method of producing sulfuric acid which comprises causing a solution of sulfurous acid to interact under pressure with a reducible oxygen-containing compound of selenium or the like.

4. A method of producing sulfuric acid which comprises causing a sulfur-dioxid-containing substance to interact in aqueous solution with a reducible oxygen-containing compound of selenium or the like.

5. A method of producing sulfuric acid which comprises causing a sulfur-dioxid-containing gas to interact in aqueous solution with a reducible oxygen-containing compound of selenium or the like substantially without access of free oxygen.

6. A method of producing sulfuric acid which comprises causing a sulfur-dioxid-containing gas to interact in aqueous solution under pressure with a reducible oxygen-containing compound of selenium or the like substantially without access of free oxygen.

7. A method of producing sulfuric acid which comprises causing a sulfur-dioxid-containing substance to interact under pressure with a reducible oxygen-containing compound of selenium or the like substantially without access of free oxygen, and agitating the mixture to effect a more complete elimination of the reducible oxygen-containing compound of selenium or the like.

8. A method of producing sulfuric acid which comprises causing a solution of sulfurous acid to interact under pressure with a reducible oxygen-containing compound of selenium or the like, and agitating the mixture to effect a more complete elimination of the reducible oxygen-containing compound of selenium or the like.

9. A method of producing sulfuric acid which comprises causing a sulfur-dioxid-containing substance to interact in aqueous solution under pressure with a reducible oxygen-containing compound of selenium or the like, and agitating the mixture to effect a more complete elimination of the reducible oxygen-containing compound of selenium or the like.

10. A method of producing sulfuric acid which comprises causing a sulfur-dioxid-containing gas to interact in aqueous solution under pressure with a reducible oxygen-containing compound of selenium or the like substantially without access of free oxygen, and agitating the mixture to effect a more complete elimination of the reducible oxygen-containing compound of selenium or the like.

11. A method of producing sulfuric acid which comprises causing a sulfur-dioxid-containing substance to interact with a reducible oxygen-containing compound of selenium or the like substantially without access of free oxygen, and reacting with a reducing agent on the sulfuric acid thus formed to substantially eliminate the reducible oxygen-containing compound of selenium or the like.

12. A method of producing sulfuric acid which comprises causing a sulfur-dioxid-containing substance to interact under pressure with a reducible oxygen-containing compound of selenium or the like substantially without access of free oxygen, and reacting with a reducing agent on the sulfuric acid thus formed to substantially eliminate the reducible oxygen-containing compound of selenium or the like.

13. A method of producing sulfuric acid which comprises causing a sulfur-dioxid-containing gas to interact in aqueous solution with a reducible oxygen-containing compound of selenium or the like, and reacting with a reducing agent on the sulfuric acid thus formed to substantially eliminate the reducible oxygen-containing compound of selenium or the like.

14. A method of producing sulfuric acid which comprises causing a sulfur-dioxid-containing gas to interact in aqueous solution under pressure with a reducible oxygen-containing compound of selenium or the like, and reacting with a reducing agent on the sulfuric acid thus formed to substantially eliminate the reducible oxygen-containing compound of selenium or the like.

15. A method of producing sulfuric acid which comprises causing a sulfur-dioxid-containing gas to interact in aqueous solution with a reducible oxygen-containing compound of selenium or the like substantially without access of free oxygen, and reacting with a reducing gas on the sulfuric acid thus formed to substantially eliminate the reducible oxygen-containing compound of selenium or the like.

16. A method of producing sulfuric acid which comprises causing a sulfur-dioxid-containing gas to interact in aqueous solution under pressure with a reducible oxygen-containing compound of selenium or the like substantially without access of free oxygen, and reacting with a reducing gas on the sulfuric acid thus formed to substantially eliminate the reducible oxygen-containing compound of selenium or the like.

17. A method of producing sulfuric acid which comprises causing a sulfur-dioxid-containing substance to interact under pressure with a reducible oxygen-containing compound of selenium or the like, agitating the mixture to effect a more complete elimination of the reducible oxygen-containing compound of selenium or the like, and reacting with a reducing agent on the sulfuric acid thus formed to further eliminate the reducible oxygen-containing compound of selenium or the like.

18. A method of producing sulfuric acid which comprises causing a sulfur-dioxid-containing substance to interact with a reducible oxygen-containing compound of selenium or the like substantially without access of free oxygen, and reacting with a further quantity of sulfur-dioxid-containing substance on the sulfuric acid thus formed to substantially eliminate the reducible oxygen-containing compound of selenium or the like.

19. A method of producing sulfuric acid which comprises causing a sulfur-dioxid-containing substance to interact under pressure with a reducible oxygen-containing compound of selenium or the like substantially without access of free oxygen, and reacting with a further quantity of sulfur-dioxid-containing substance on the sulfuric acid thus formed to substantially eliminate the reducible oxygen-containing compound of selenium or the like.

20. A method of producing sulfuric acid which comprises causing a sulfur-dioxid-containing gas to interact in aqueous solution with a reducible oxygen-containing compound or the like, and reacting with a further quantity of sulfur-dioxid-containing gas on the sulfuric acid thus formed to substantially eliminate the reducible oxygen-containing compound of selenium or the like.

21. A method of producing sulfuric acid which comprises causing a sulfur-dioxid-containing gas to interact in aqueous solution under pressure with a reducible oxygen-containing compound of selenium or the like, and reacting with a further quantity of sulfur-dioxid-containing gas on the sulfuric acid thus formed to substantially eliminate the reducible oxygen-containing compound of selenium or the like.

22. A method of producing sulfuric acid which comprises causing a sulfur-dioxid-containing gas to interact in aqueous solution with a reducible oxygen-containing compound of selenium or the like substantially without access of free oxygen, and reacting with a further quantity of sulfur-dioxid-containing gas on the sulfuric acid thus formed to substantially eliminate the reducible oxygen-containing compound of selenium or the like.

23. A method of producing sulfuric acid which comprises causing a sulfur-dioxid-containing gas to interact in aqueous solution under pressure with a reducible oxygen-containing compound of selenium or the like substantially without access of free oxygen, and reacting with a further quantity of sulfur-dioxid-containing gas on the sulfuric acid thus formed to substantially eliminate the reducible oxygen-containing compound of selenium or the like.

24. A method of producing sulfuric acid which comprises causing a sulfur-dioxid-containing substance to interact under pressure with a reducible oxygen-containing compound of selenium or the like, agitating the mixture to effect a more complete elimination of the reducible oxygen-containing compound of selenium or the like, and reacting with a further quantity of sulfur-dioxid-containing substance on the sulfuric acid thus formed to substantially eliminate the reducible oxygen-containing compound of selenium or the like.

25. A method of making sulfuric acid which comprises passing a sulfur-dioxid-containing gas into an aqueous solution of dioxid of selenium or the like.

26. A method of making sulfuric acid which comprises passing a sulfur-dioxid-containing gas under pressure into an aqueous solution of dioxid of selenium or the like.

27. A method of making sulfuric acid which comprises passing a sulfur-dioxid-containing gas into an aqueous solution of dioxid of selenium or the like, and agitating the mixture to effect a more complete elimination of the dioxid of selenium or the like.

28. A method of making sulfuric acid which comprises passing a sulfur-dioxid-containing gas under pressure into an aqueous solution of dioxid of selenium or the like, and reacting with a reducing gas on the sulfuric acid thus formed to substantially eliminate the dioxid of selenium or the like.

29. A method of making sulfuric acid which comprises passing a sulfur-dioxid-containing gas under pressure into an aqueous solution of dioxid of selenium or the like, and reacting with a further quantity of sulfur-dioxid-containing gas on the sulfuric acid thus formed to substantially eliminate the dioxid of selenium or the like.

30. A method of purifying sulfuric acid containing in solution a reducible compound of selenium or the like which comprises passing a reducing gas under pressure into such acid.

31. A method of purifying sulfuric acid containing in solution a dioxid of selenium or the like which comprises passing a reducing gas under pressure into such acid.

32. A method of purifying sulfuric acid containing in solution a reducible compound of selenium or the like which comprises passing a sulfur-dioxid-containing gas under pressure into such acid.

33. A method of purifying sulfuric acid containing in solution dioxid of selenium or the like which comprises passing a sulfur-dioxid-containing gas under pressure into such acid.

In testimony whereof I have signed my name to this specification this 21st day of September, 1918.

PAUL HAESELER.